No. 629,990. Patented Aug. 1, 1899.
R. FRIEND & L. S. RAY.
LAWN MOWER.
(Application filed Apr. 15, 1899.)
(No Model.)
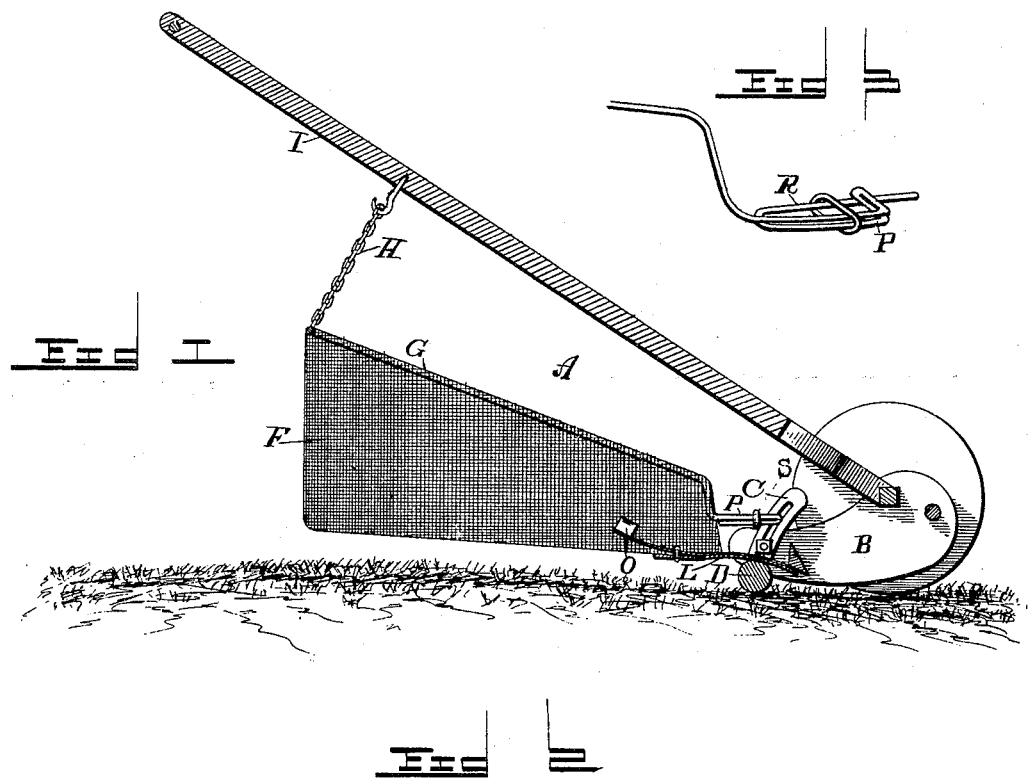
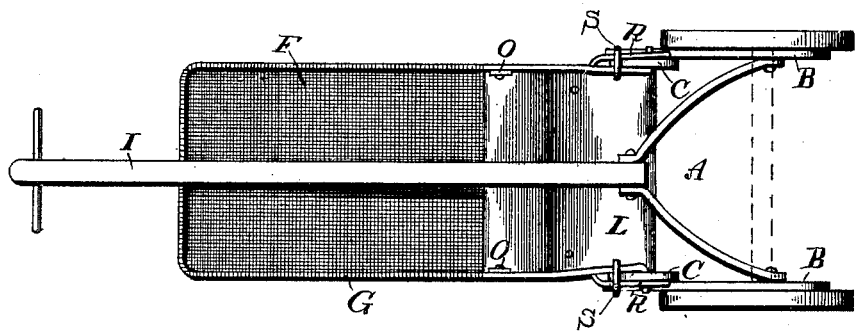
Witnesses
John Maupin
Rosann Smith
Inventors
Robert Friend,
L. S. Ray,
per E. R. McAfee
Attorney
THE NORRIS PETERS CO., PHOTO-LITHO., WASHINGTON, D. C.

UNITED STATES PATENT OFFICE.

ROBERT FRIEND AND LEONARD SHAW RAY, OF MELROSE, MASSACHUSETTS.

LAWN-MOWER.

SPECIFICATION forming part of Letters Patent No. 629,990, dated August 1, 1899.

Application filed April 15, 1899. Serial No. 713,140. (No model.)

*To all whom it may concern:*

Be it known that we, ROBERT FRIEND and LEONARD SHAW RAY, residing at Melrose, in the county of Middlesex and State of Massachusetts, have invented certain new and useful Improvements in Lawn-Mowers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to an improvement in lawn-mowers; and it consists in the combination, with an ordinary lawn-mower, of a basket for catching the grass, suitable slotted supports for the roller secured to the lawn-mower, a plate secured to the lower part of the basket and which has its front end to extend directly under the cutter, and suitable fastening or clamping wires by means of which the basket is detachably secured to the slotted supports for the roller, all of which will be more fully described hereinafter.

The object of our invention is to provide a basket attachment for lawn-mowers, so as to catch the grass as rapidly as it is cut, and which basket can be readily removed from the lawn-mower when not desired for use.

In the accompanying drawings, which represent our invention, Figure 1 is a vertical longitudinal section of an attachment to a lawn-mower which embodies our invention. Fig. 2 is a plan view of the same. Fig. 3 is a detached view of the clamping-wires.

A represents an ordinary lawn-mower; B, the rearwardly-extending arms or projections, and to the rear ends of which the curved slotted supports C for the roller D are adjustably clamped. These parts being old and forming no part of our invention are not here more fully described. The basket F is made of any suitable material, preferably of light wire, and which has a binding wire or rod G extending around its top edge and beyond its front end, as shown. The rear end of the basket is supported by means of the chain H, which is hooked onto the under side of the handle I, as shown. The front end of the basket is supported by the extensions of the front ends of the wires, which are formed into clamps, and by the imperforate plate L, resting upon the top of the roller. This plate L has its front end to extend forward just under the cutter-bar, and is curved upwardly at its rear end and provided with ears O, which are fastened to the sides of the basket. The front edge of the plate is turned backwardly under the basket, so as to form a double thickness of material, and then the two thicknesses of material are fastened across the front edge of the basket, so as to secure them rigidly together. The front ends of the wires G are extended forward, and then are turned at right angles, so as to form the prongs P, and then the wires are doubled backwardly upon themselves, so as to form double thicknesses for the prongs, and then the wires are turned at right angles and bent backwardly to or near the front edges of the basket and then turned forward again, so as to form the spring-arms R. The prongs are passed through the slots in the slotted bearings or supports C, and the clamping-loops S are forced forward upon these wires, so as to hold the prongs securely in the slots. The plate L, resting upon the roller, and these prongs catching in the slots are the only parts by which the basket is fastened to the lawn-mower, and these prongs moving freely in the slots allow the handle to be raised and lowered to any desired degree. In order to detach the basket, it is only necessary to move back the clamping-loops, when the free spring-arms R will fly outward and the loops can then be detached from the slots without the slightest trouble.

Having thus described our invention, we claim—

A lawn-mower provided with slotted supports for the roller, combined with a basket that is supported at its rear end upon the handle, a plate secured to the front end of the basket, and which rests upon the roller, and the wire G bent so as to form a prong, which passes through the slotted supports, and a spring-arm; and the sliding loop placed upon the wires, substantially as set forth.

In testimony whereof we affix our signatures in presence of two witnesses.

ROBERT FRIEND.
LEONARD SHAW RAY.

Witnesses:
 CHAS. W. FRIEND,
 HAROLD A. GRINDLE.